Patented Apr. 19, 1949

2,467,893

UNITED STATES PATENT OFFICE 2,467,893

PIPERAZINE CARBOXAMIDES AND METHOD OF PREPARING SAME

Samuel Kushner, Nanuet, and Louis Brancone, Pearl River, N. Y., assignors to American Cyanamid Company, New York, N. Y., a corporation of Maine No Drawing. Original application April 12, 1946, Serial No. 661,884. Divided and this application February 14, 1948, Serial No. 8,314

10 Claims. (Cl. 260—268)

The present invention relates to substituted piperazines. More particularly, it relates to piperazine carboxamides and to a method of preparing the same. This application is a division of our co-pending application, Serial Number 661,884, filed April 12, 1946.

The new compounds of the present invention have the following general formula:

$$R-N\begin{matrix} CH_2-CH_2 \\ \diagup \quad \diagdown \\ \diagdown \quad \diagup \\ CH_2-CH_2 \end{matrix} N-\underset{\underset{O}{\|}}{C}-NHR'$$

in which R is hydrogen or an alkyl radical and R' is an alkyl radical.

In the general formula R can be hydrogen or an alkyl radical such as methyl, ethyl, propyl, isopropyl, butyl, isobutyl, tertiary butyl, amyl, isoamyl, hexyl and the like. Also, R' may be an alkyl radical such as those named above.

In general the compounds prepared by the present invention are colorless to pale yellow oils, soluble in most organic solvents. In the form of their acid salts they are white, often hygroscopic solids, soluble in water.

These compounds are prepared by reacting piperazine or an N-alkyl piperazine with a mono-substituted carbamyl chloride. The reaction is carried out within the range of 0° C. to about 40° C., preferably at room temperature in a solvent such as chloroform, carbon tetrachloride, ethyl acetate, water, etc.

When chloroform or similar organic solvent is used in carrying out the present invention, we prefer to recover the product by first saturating the reaction mixture with hydrogen chloride at a low temperature. Any unreacted piperazine is precipitated as the hydrochloride salt and often can be separated from the desired product by simple filtration. The reaction mixture is concentrated by removal of solvent and the product obtained as a solid is crystallized if desired.

When the reaction is carried out in water as a solvent, in the presence of alkali, the preferred method of recovering the product is to saturate the reaction mixture with potassium carbonate, ammonium sulfate or similar salts. The product is then extracted with a solvent such as ether or chloroform, preferably dried and then distilled.

Among the new compounds which can be prepared by the process of the present invention are the following:

1-methyl-4-piperazine-N-ethyl carboxamide
1-methyl-4-piperazine-N-methyl carboxamide
1-methyl-4-piperazine-N-propyl carboxamide
1-methyl-4-piperazine-N-isopropyl carboxamide
1-isopropyl-4-piperazine-N-hexyl carboxamide
1-ethyl-4-piperazine-N-amyl carboxamide Some of these compounds are useful in the treatment of filariasis and in veterinary practice, in the treatment of ascrids in dogs.

Our invention will now be illustrated in greater particularity in the following example, in which a representative piperazine mono-carboxamide is prepared.

To a stirred solution of 5 cc. of 1-methyl piperazine in 100 cc. of chloroform was added at room temperature over a one hour period 2.7 g. of ethyl carbamyl chloride in 50 cc. of chloroform. Into the cooled solution was passed HCl gas and complete precipitation occurred. The desired 1-methyl-4-piperazine-N-ethyl carboxamide hydrochloride was separated from the unreacted 1-methyl piperazine dihydrochloride by its solubility in normal butyl alcohol.

We claim:

1. Compounds having the general formula:

$$R-N\begin{matrix} CH_2-CH_2 \\ \diagup \quad \diagdown \\ \diagdown \quad \diagup \\ CH_2-CH_2 \end{matrix} N-\underset{\underset{O}{\|}}{C}-NHR'$$

in which R is a member of the group consisting of hydrogen and alkyl radicals and R' is an alkyl radical, and salts thereof.

2. A compound having the general formula:

$$R-N\begin{matrix} CH_2-CH_2 \\ \diagup \quad \diagdown \\ \diagdown \quad \diagup \\ CH_2-CH_2 \end{matrix} N-\underset{\underset{O}{\|}}{C}-NHR'$$

in which R and R' are alkyl radicals.

3. 1 - methyl - 4 - piperazine - N - ethyl carboxamide.

4. 1 - methyl - 4 - piperazine - N - methyl carboxamide.

5. 1 - methyl - 4 - piperazine - N - propyl carboxamide.

6. A method of preparing compounds having the formula:

$$R-N\begin{matrix} CH_2-CH_2 \\ \diagup \quad \diagdown \\ \diagdown \quad \diagup \\ CH_2-CH_2 \end{matrix} N-\underset{\underset{O}{\|}}{C}-NHR'$$

in which R is a member of the group consisting of hydrogen and alkyl radicals and R' is an alkyl radical which comprises mixing together and allowing to react a member of the group consisting of piperazine and 1-alkyl piperazines and a mono-alkyl carbamyl chloride in a solvent.

7. A method of preparing compounds having the formula:

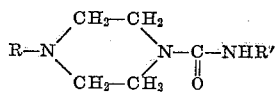

in which R and R' are alkyl radicals which comprises mixing together and allowing to react a 1-alkyl piperazine and a mono-alkyl carbamyl chloride in a solvent.

8. A method of preparing 1-methyl-4-piperazine-N-ethyl carboxamide which comprises mixing together and allowing to react 1-methyl piperazine and mono-ethyl carbamyl chloride in a solvent.

9. A method of preparing 1-methyl-4-piperazine-N-methyl carboxamide which comprises mixing together and allowing to react 1-methyl piperazine and mono-methyl carbamyl chloride in a solvent.

10. A method of preparing 1-methyl-4-piperazine-N-propyl carboxamide which comprises mixing together and allowing to react 1-methyl piperazine and mono-propyl carbamyl chloride in a solvent.

SAMUEL KUSHNER.
LOUIS BRANCONE.

No references cited.